Aug. 15, 1944. J. M. INGALLS 2,355,866
STOCK PUSHER
Filed May 15, 1943

Inventor
John M. Ingalls
by Wright Brown Quinby & May
Attys.

Patented Aug. 15, 1944

2,355,866

UNITED STATES PATENT OFFICE 2,355,866

STOCK PUSHER

John M. Ingalls, Windsor, Vt., assignor to Cone Automatic Machine Company Inc., Windsor, Vt., a corporation of Vermont Application May 15, 1943, Serial No. 487,111

2 Claims. (Cl. 29—61)

This invention relates to stock pushers such as are employed in feeding bar stock through rotary work carrying spindles of lathes and screw machines. It has for an object to improve the control of the stock so that the desired amount of feed is insured at each actuation.

A further object is to provide means by which the grip of the pusher on the stock may be released easily when the gripper has been removed from the spindle.

Still another object is to prevent the work-engaging means of the pusher from spiraling back on the work, due to the friction between the pusher and its axially moving means.

Figure 1:
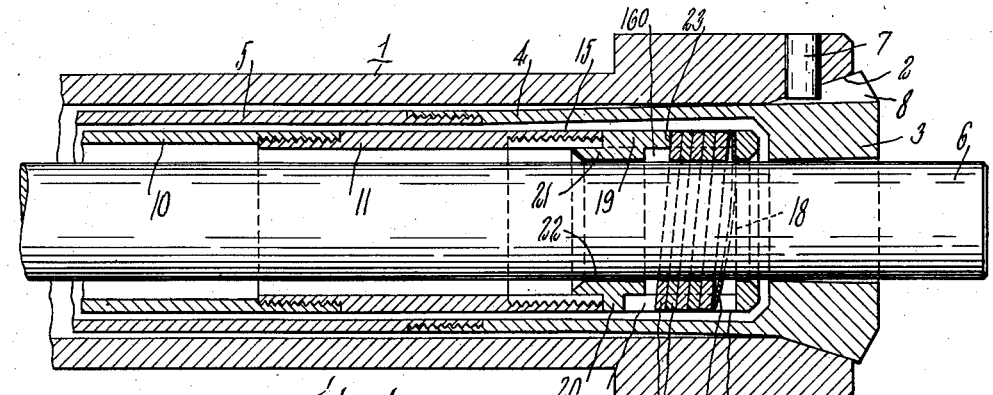
Figure 2:
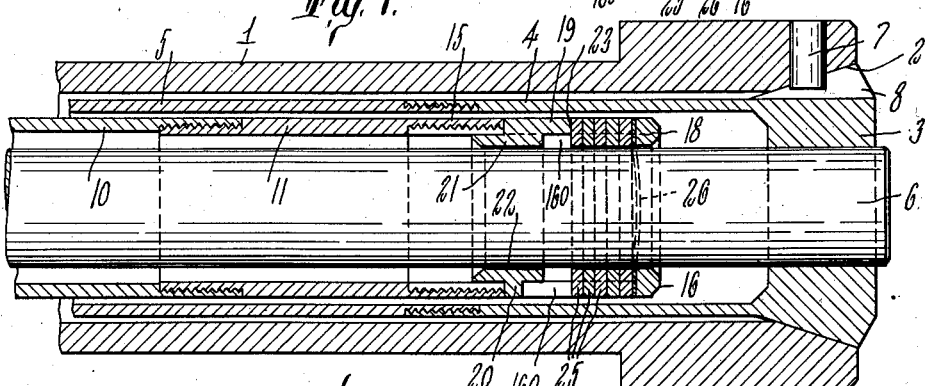

Further objects and advantages will appear from a more complete description of an embodiment of the invention shown in the accompanying drawing in which Figures 1 and 2 are central longitudinal sectional views through the forward portion of a work spindle showing the pusher in work-gripping and released positions, respectively.

Figure 3:
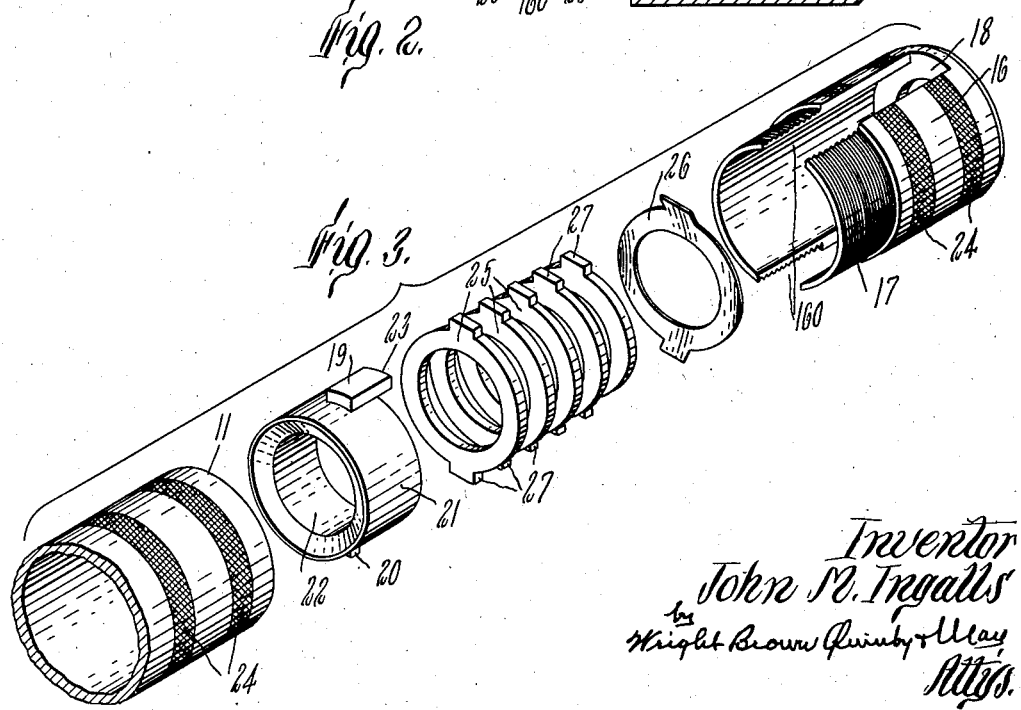

Figure 3 is an exploded perspective view of certain parts of the pusher.

Referring to the drawing, at 1 is indicated a tubular work spindle, the bore at its forward end flaring outwardly as at 2 for the reception of the matingly tapered outer portions of spring collet jaws 3. These jaws are carried by a collet sleeve 4 which may have threaded connection at its rear end with an axially movable actuating sleeve 5 by which the collet may be moved axially, movement to the left wedging the collet jaws 3 inwardly and against the work piece 6, while motion in the opposite direction allows the spring jaws 3 to separate, as shown in Figure 1 to release the work. Means such as a driving pin 7 secured to the spindle and projecting into a slot 8 in one of the collet jaws insures simultaneous rotation of these jaws and the work gripped therebetween with the spindle.

Inwardly of the collet-actuating sleeve 5 is a pusher-actuating sleeve 10, and threaded to its forward end is the pusher 11 which forms the subject matter of this invention. This pusher 11 comprises a tube which is free to slide within the tube 5 and the collet 4, and the forward end of which is internally threaded as at 15. The outer end of the tube 11 is partly closed off as by a slotted tube 16 having a reduced diameter externally threaded portion 17 which engages the internally threaded portion 15 in the enlarged diameter end of the pusher tube 11, and an integral end wall 18 provided with a central bore for the passage of the stock 6. Seated against the bases of the diametrically opposite slots 160 in the tube 16 are a pair of lugs 19 and 20 which project outwardly beyond the remainder of the periphery of a sleeve 21. This sleeve, as shown, has a hole 22 therethrough, which is slightly larger than the diameter of the stock 6 which is taken by the spindle. The tubes 11 and 16 may be provided with knurled annular surface portions 24 to permit them to be grasped and relatively rotated for assembly or disassembly.

The lug 19 is extended further from the base of the slot 160 than is the lug 20, to form an abutment 23, which as shown is eccentric to the pusher and is diametrically opposite to the other slot 160, and since it forms a portion of the lug 19, is directly in line with the one slot 160.

Between the sleeve 21 and the wall 18 there are positioned stock-gripping rings 25 and a dished spring annulus 26. As shown there are five of these rings 25, but more or less might be used as desired. Each of these rings is provided with an outwardly projecting portion 27 at diametrically opposite sides which may ride within the slots 160 and prevent relative rotation between the stock-gripping rings and the pusher tube 11. The spring 26, being of little thickness, permits the gripping of the stock to be done close to the forward end of the pusher so that the stock may be utilized close to its rear end.

The spring 26 reacting between the outermost gripping ring 25 and the wall 18 tends to hold the gripping rings canted toward the position shown in Figure 1 with the left hand ring 25 bearing at one side against the abutment 23 and the other side diametrically related thereto being pressed toward contact with the extension 20 as far as may be permitted by engagement of the inner edges of the rings with the stock 6. This is the normal gripping position of the rings on the stock.

As the stock pusher is retracted, the engagement between the rings and the stock, which is then held firmly between the collet jaws 3 in the position shown in Figure 2, causes the rings to be rocked toward perpendicular to the length of the stock, freeing the gripping action and allowing the stock gripper to be retracted along the length of the stock. As soon as this retracting motion is completed, the spring 26 tends to tilt or cant the rings to the position shown in Figure 1, thus resuming their gripping relation thereto so that thereafter when the stock pusher is moved forwardly toward the jaws 3 and the jaws release the work, the work is carried forwardly with the pusher, thus to feed a length of stock forwardly from the spindle in position to be operated upon by the tools of the machine.

Mechanism for actuating the collet to grip and release the work and to actuate the pusher to retract relative to the work and then to grip it and advance it, commonly include collars on the rear ends of the sleeves 5 and 10, respectively, which are given their reciprocatory motions and at the same time are permitted rotation by the spindle-driving means. This is shown, for example, in the Cone Patent No. 1,979,366, granted November 6, 1934, for Work holding and feeding mechanisms. It will be noted that the rotation of the work from the rotation imparted to the spindle 1 is transmitted to the work through the collet mechanism, when this mechanism is closed as is shown in Figure 2, and it is during this time that the stock pusher is retracted to take a fresh grip on the work. Experience has shown that the frictional drag of the stock pusher collar on the mechanism which retracts it, tends to slow the rotation of the pusher which is accomplished by its engagement with the stock, which, in turn, is driven through the collet. The engagement of the projections 27 of the gripping rings in the slots 160 prevents the relative rotation of these rings with respect to the collet tube 11 and prevents this tendency to retard the rotation of the pusher from producing such relative rotation which would tend to cause the engagement between the gripping rings and the stock to spiral back on the stock. Where spiraling action is permitted, the control of the stock is somewhat erratic and unnecessary wear is produced between the gripping rings and the stock and the gripping rings and the pusher tube. By the provision of the slots and the extensions 27, therefore, relative rotation between the rings and pusher tube is impossible so that this undesirable action is prevented. Furthermore, it makes possible the ready freeing of stock from the pusher when the pusher is removed from the machine for removal of a short stock length preparatory to inserting a new piece of stock therein, as it is an easy matter to engage the ring extensions and tilt the rings toward the position shown in Figure 2 when such release of stock is desired.

The provision of the slots 160 extending through diametrically opposite parts of the pusher tube 11 likewise permits the gripping rings to be reversed so that when one set of internal gripping edges have been worn, the diametrically opposite portions may be employed for gripping purposes.

From the foregoing description of an embodiment of this invention it should be evident to those skilled in the art that various changes and modifications might be made without departing from the spirit or scope of this invention.

I claim:

1. A stock pusher comprising a pair of tubes united coaxially, the forward one of said tubes having its forward end partly closed off but provided with an opening through which the stock may extend, said forward tube being longitudinally slotted back from said forward end, the other of said tubes closing off the rear end of said slot, a plurality of stock gripping rings within said forward tube each ring having a projection riding in said slot, an abutment fixed within one of said tubes eccentric thereto and against which the rearward of said rings may engage in canted position gripping the stock extending through said tubes, and a spring reacting between the forward ring and said forward end tending to press said rings backwardly as far as permitted by said abutment in stock-gripping canted position.

2. A stock pusher comprising a pair of tubes united coaxially, the forward one of said tubes having its forward end partly closed off but provided with an opening through which the stock may extend, said forward tube being longitudinally slotted back from said forward end, the other of said tubes closing off the rear end of said slot, a plurality of stock-gripping rings within said forward tube each ring having a projection riding in said slot, a sleeve fitting within said tubes and having a lug engaged in said slot and projecting forwardly of the remainder of said sleeve to form an abutment eccentric of said sleeve and against which the rearward of said rings may engage in canted position gripping the stock extending through said tubes, and a spring reacting between the forward ring and said forward end tending to press said rings backwardly as far as permitted by said abutment in stock-gripping canted position.

JOHN M. INGALLS.